No. 720,391. PATENTED FEB. 10, 1903.
T. ADAMS.
CORN PLANTER.
APPLICATION FILED NOV. 22, 1901.
NO MODEL. 3 SHEETS—SHEET 1.
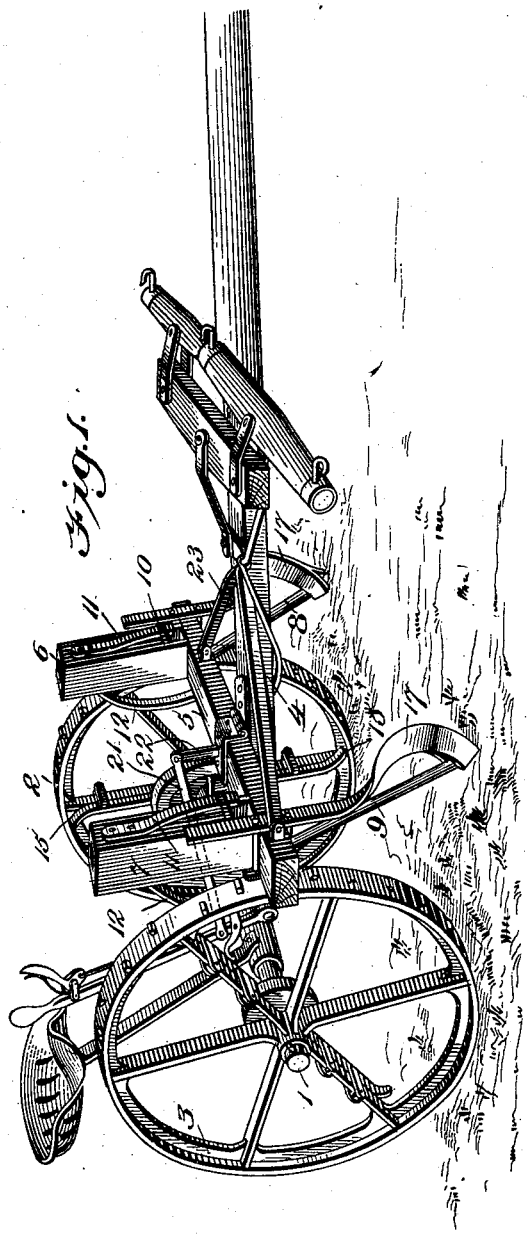
Witnesses
Inventor
Thomas Adams
By Victor J. Evans
Attorney No. 720,391. PATENTED FEB. 10, 1903.
T. ADAMS.
CORN PLANTER.
APPLICATION FILED NOV. 22, 1901.
NO MODEL. 3 SHEETS—SHEET 2.
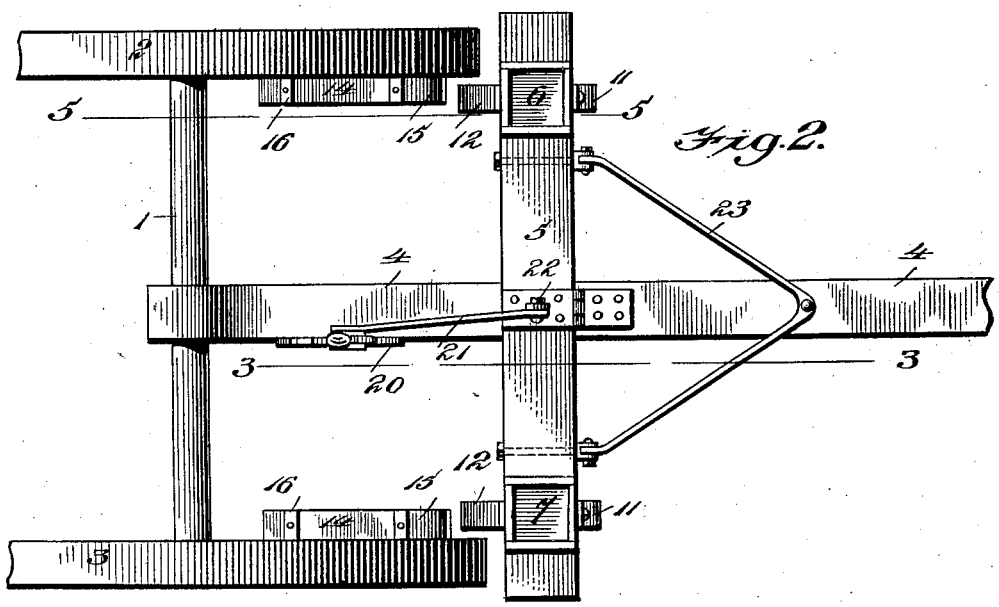
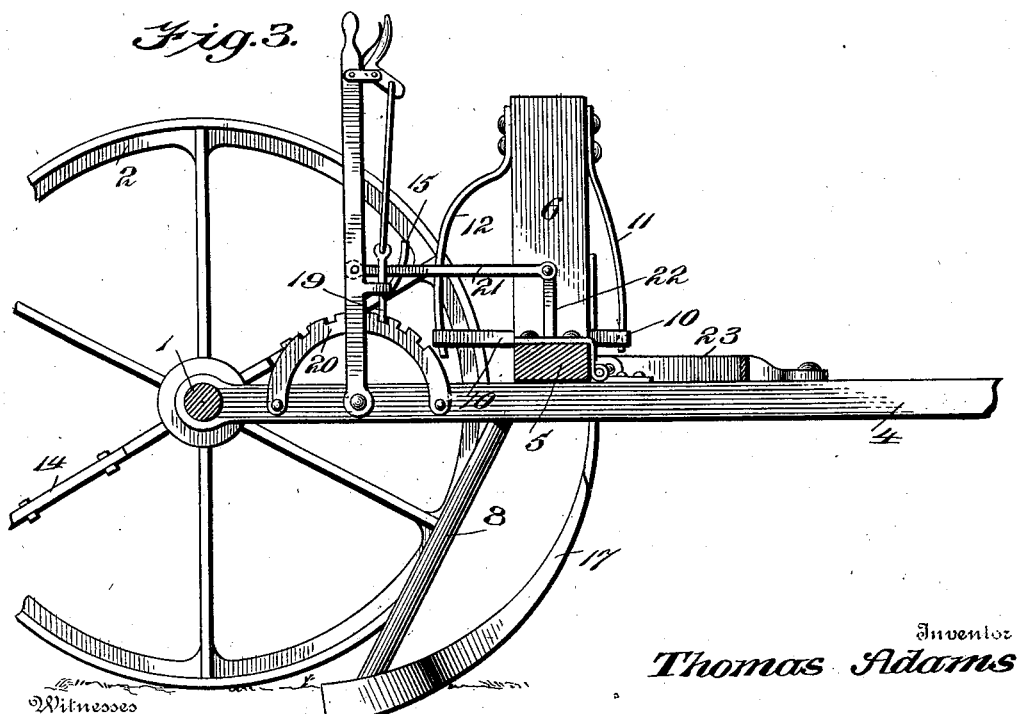
Witnesses
H. G. Dieterich
B. J. Funk
Inventor
Thomas Adams
By Victor J. Evans
Attorney

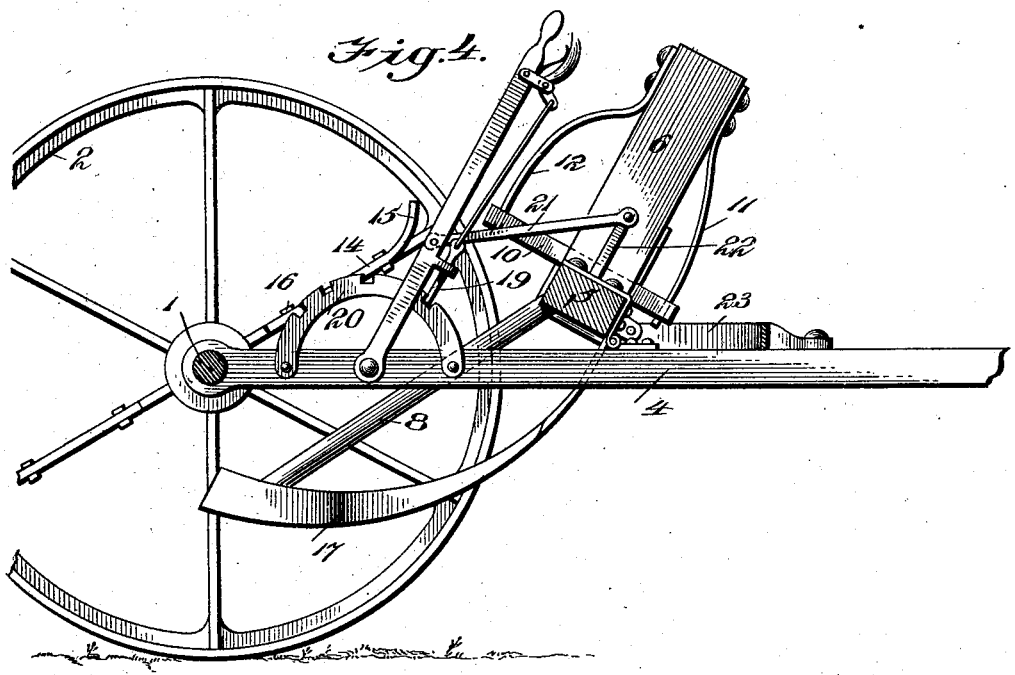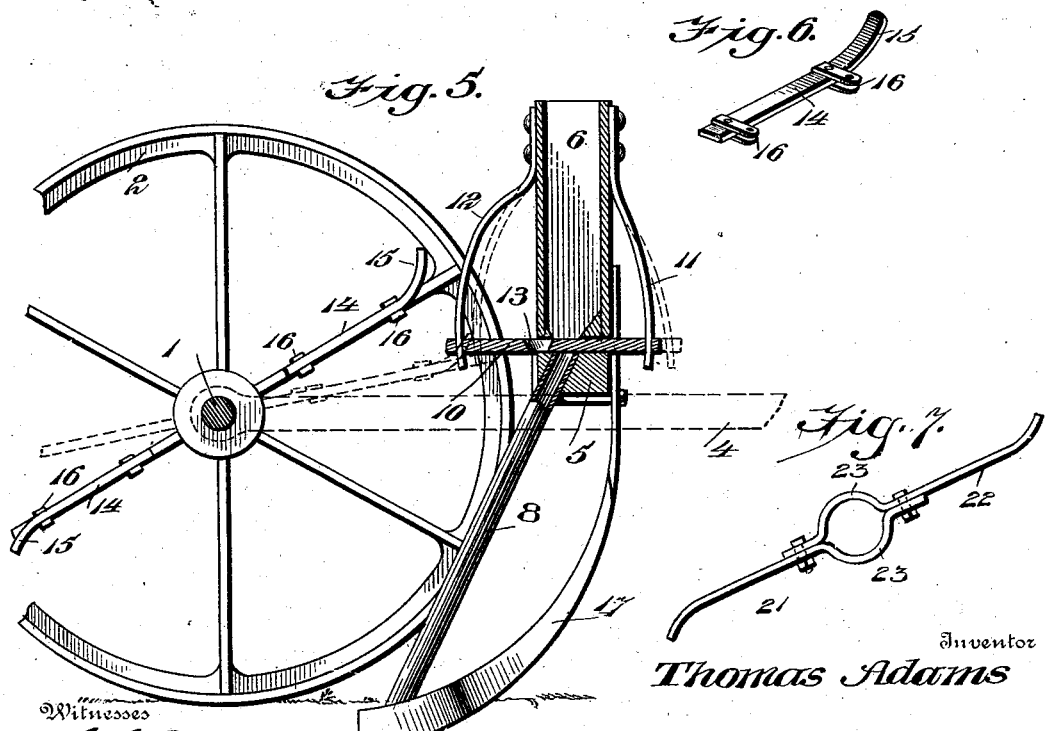

UNITED STATES PATENT OFFICE.

THOMAS ADAMS, OF MANDAN, NORTH DAKOTA.

CORN-PLANTER.

SPECIFICATION forming part of Letters Patent No. 720,391, dated February 10, 1903.

Application filed November 22, 1901. Serial No. 83,300. (No model.)

*To all whom it may concern:*

Be it known that I, THOMAS ADAMS, a citizen of the United States, residing at Mandan, in the county of Morton and State of North Dakota, have invented certain new and useful Improvements in Corn-Planters; and I do hereby declare the following to be a full, clear, and exact description of the invention, such as will enable others skilled in the art to which it appertains to make and use the same.

This invention relates to corn-planters; and the primary object thereof is to provide a cheap, durable, and efficient planter provided with an automatic feed for dropping seed in the furrow.

A further object is to provide means for raising the seed-spout away from the ground as the machine is being transported or for other purposes.

Further objects, as well as the novel details of construction, will be described hereinafter, and the peculiar arrangement of parts to be illustrated in the accompanying drawings, in which—

Figure 1 is a perspective view of the planter constructed in accordance with my invention. Fig. 2 is a top plan view of the same. Fig. 3 is a vertical longitudinal section on the line 3 3 of Fig. 2. Fig. 4 is a similar view showing the parts in their abnormal position with the feed-spout and coverer in an elevated position. Fig. 5 is a vertical sectional view on the line 5 5 of Fig. 2. Fig. 6 is a detail perspective view of one of the actuating-arms secured to the wheels, and Fig. 7 is an elevation of a modification of an actuating-arm.

Referring now to the drawings by numerals of reference, 1 designates an axle provided with the usual wheels 2 and 3. A draft-pole 4 is secured to the axle intermediate the wheels and carries a hinged transversely-arranged bar 5, on which are positioned the seedboxes 6 and 7, arranged adjacent the wheels 2 and 3.
Inclined openings are provided in the bar 5, in which are located rearwardly-extending feed-spouts 8 and 9, communicating with the seedboxes 6 and 7 and discharging the seed at a point adjacent the wheels. Each seedbox is provided with a laterally-disposed seed-slide, (designated by the reference-numeral 10,) and secured to the sides of the seedbox of the respective ends of the seed-slide are two springs 11 and 12, so that when the opening 13 in the seed-slide is forced in line with the feed-spout opening the springs will force said opening out of line therewith to cut off the discharge of the grain. It will of course be understood that the opening in the seed-slide is normally in a position similar to that shown in Fig. 5 and can only be brought into communication with the feed-spout when actuated by one of the arms 14, of which there are a plurality secured to each wheel. These arms 14 consist of narrow strips with curved ends 15, which are adapted to engage the ends of the seed-slides, and forcing themselves past the same the said seed-slides will be forced forward, thereby bringing the discharge end of the seedbox-opening in the seed-slide and the feed-spout in alinement, permitting the seed to drop down and be discharged into the furrow. There may be any number of these actuating-arms on each wheel, according to the distance at which the seed is to be dropped. Each arm is provided with one or more U-shaped cleats 16, which are adapted to fit over the spokes of the wheels and securely fasten said arms thereto.

17 designates a downwardly and rearwardly extending combined furrow opener and carrier, of which there are two, secured one adjacent each seedbox, the free end of which opener and carrier terminates adjacent the discharge-spout and acts upon the earth so as to roll the same rearwardly over the seed after it has been deposited in the ground. As the wheels pass over the same it is packed in the ground in the usual manner.

As before stated, the transverse bar 5 is hinged to the draft-pole, and as this bar carries the feed-spouts and the combined furrow-openers and carriers, as well as the seedboxes, the entire operating mechanism may be tilted so as to raise the said openers and carriers and feed-spout above the ground when transporting the machine or when it is not desired to plant the corn or other seed. This tilting may be done by a lever pivotally secured to the draft-bar and carrying a pawl 19, which engages a segmental rack 20, secured adjacent thereto and carried by the draft-bar. This lever is connected to the transverse bar 5 by a link-bar 21, which pivotally engages an upwardly-extending stud 22, carried by said bar, as clearly shown in Figs. 3 and 4. In order to strengthen the parts, I arrange a V-shaped brace-bar 23 on the draft-bar and the respective ends of which are pivotally secured to the bar 5.

In Fig. 7 I have illustrated a modified form of an actuating-arm, in which two oppositely-projecting arms are secured together to fit around the hub of the machine to which the feed mechanism may be secured. These arms are designated by reference-numerals 21 and 22, and at one end of each is arranged a semicircular bent portion 23, which are oppositely disposed, so as to form a circular band to inclose the hub. This construction of actuating-arms will be employed as above described and is particularly applicable to wheels which are not provided with spokes.

Having thus fully described my invention, what I claim, and desire to secure by Letters Patent, is—

1. In a seed-planter, the combination with the running-gear and an actuating means moving in a fixed path, of a member hinged transversely of the running-gear, seedboxes mounted upon the upper side thereof, spouts secured to the lower side of said members, reciprocating seed-slides in the boxes, springs secured to the opposite ends of the slides and the boxes to hold the slides closed and in the path of the actuating means, a hand-lever fulcrumed on the running-gear, a stud on the transverse member, and a link-bar connecting the hand-lever and the stud, whereby the seedboxes may be thrown forwardly out of engagement with the actuating means.

2. In a seed-planter the combination with the running-gear, and an actuating means moving in a fixed path, of a brace secured to the running-gear and having diverging arms, a transverse member hinged to the running-gear and to the arms of the brace, seedboxes mounted upon the upper side of the transverse member, seed-slides in the boxes, springs secured to the opposite ends of the slides and the boxes to hold the slides closed, and in the path of the actuating means, seed-spouts secured to the lower side of the transverse member, a hand-lever fulcrumed on the running-gear, a vertical stud on the transverse member, and a link-bar connecting the hand-lever and the stud, whereby the boxes may be thrown forwardly out of the path of the actuating means and the spouts be elevated.

3. In a seed-planter, the combination with the running-gear and the ground-wheels, of striker-arms secured to the wheels, each comprising a bar having lateral projections arranged to grasp and be fastened to the spoke of the wheel, a member hinged transversely of the running-gear, seedboxes mounted upon the upper side thereof, spouts secured to the lower side thereof, reciprocating seed-slides in the boxes, springs secured to the opposite ends of the slides and the boxes to hold the slides closed and in the path of the striker-arms, a hand-lever fulcrumed on the running-gear, a stud on the transverse member, and a link-bar connecting the hand-lever and the stud whereby the seedboxes may be thrown forwardly out of the path of the striker-arms and elevate the spouts.

In testimony whereof I affix my signature in presence of two witnesses.

THOMAS ADAMS.

Witnesses:
H. G. VOSS,
J. R. GILBREATH.